United States Patent
Hörsting et al.

(10) Patent No.: US 12,104,084 B2
(45) Date of Patent: Oct. 1, 2024

(54) DISPERSION PAINT

(71) Applicant: Brillux GmbH & Co. KG, Münster (DE)

(72) Inventors: Ingo Hörsting, Drensteinfurt (DE); Jan Leusmann, Nottuln (DE)

(73) Assignee: Brillux GmbH & Co. KG, Münster (DE)

( * ) Notice: Subject to any disclaimer, the term of this patent is extended or adjusted under 35 U.S.C. 154(b) by 52 days.

(21) Appl. No.: 17/208,699

(22) Filed: Mar. 22, 2021

(65) Prior Publication Data

US 2021/0206982 A1    Jul. 8, 2021

Related U.S. Application Data

(63) Continuation of application No. 16/079,201, filed as application No. PCT/EP2017/054386 on Feb. 24, 2017, now Pat. No. 10,988,627.

(30) Foreign Application Priority Data

Feb. 26, 2016 (DE) .......................... 102016002221.3

(51) Int. Cl.
| | |
|---|---|
| *C09D 5/02* | (2006.01) |
| *C09D 5/00* | (2006.01) |
| *C09D 7/20* | (2018.01) |
| *C09D 7/41* | (2018.01) |
| *C09D 7/61* | (2018.01) |
| *C09D 7/63* | (2018.01) |
| *C09D 125/06* | (2006.01) |
| *C09D 133/08* | (2006.01) |
| *C09D 133/10* | (2006.01) |
| *C09D 133/20* | (2006.01) |
| *C09D 139/06* | (2006.01) |
| *C08K 3/26* | (2006.01) |
| *C08K 3/34* | (2006.01) |
| *C08K 5/56* | (2006.01) |

(52) U.S. Cl.
CPC ................ *C09D 7/63* (2018.01); *C09D 5/00* (2013.01); *C09D 7/20* (2018.01); *C09D 7/41* (2018.01); *C09D 7/61* (2018.01); *C09D 125/06* (2013.01); *C09D 133/08* (2013.01); *C09D 133/10* (2013.01); *C09D 133/20* (2013.01); *C09D 139/06* (2013.01); *C08K 3/26* (2013.01); *C08K 2003/265* (2013.01); *C08K 3/34* (2013.01); *C08K 5/56* (2013.01)

(58) Field of Classification Search
None
See application file for complete search history.

(56) References Cited

U.S. PATENT DOCUMENTS

| | | |
|---|---|---|
| 2,323,550 A | 7/1943 | Lukens |
| 2,713,545 A | 7/1955 | Kather |
| 3,574,651 A | 4/1971 | Nitzsche et al. |
| 3,895,956 A | 7/1975 | Yoshida et al. |
| 3,923,704 A | 12/1975 | Gunning et al. |
| 4,063,958 A | 12/1977 | Roth et al. |
| 4,125,673 A | 11/1978 | Roth et al. |
| 4,137,380 A | 1/1979 | Gunning et al. |
| 4,743,199 A | 5/1988 | Weber et al. |
| 5,356,463 A | 10/1994 | Kober et al. |
| 5,584,921 A | 12/1996 | Wagner et al. |
| 5,998,525 A | 12/1999 | Wang et al. |
| 6,468,336 B1 | 10/2002 | Fiedler et al. |
| 6,638,353 B1 | 10/2003 | Rathschlag et al. |
| 7,789,959 B2 | 9/2010 | Fichtner et al. |
| 9,334,196 B2 | 5/2016 | Connors, Jr. et al. |
| 2005/0150417 A1 | 7/2005 | Hirsbrunner et al. |
| 2006/0174922 A1 | 8/2006 | Mader et al. |
| 2009/0211491 A1 | 8/2009 | Ogata et al. |
| 2010/0119850 A1 | 5/2010 | Browne et al. |
| 2013/0145966 A1 | 6/2013 | Schildbach et al. |
| 2013/0170014 A1 | 7/2013 | Kong et al. |
| 2019/0048214 A1 | 2/2019 | Hörsting et al. |
| 2022/0184257 A1 | 6/2022 | Hörsting et al. |

FOREIGN PATENT DOCUMENTS

| | | |
|---|---|---|
| AU | 617422 | 1/1990 |
| CH | 618462 | 7/1980 |
| CN | 2335633 | 9/1999 |
| DE | 1031910 B | 6/1958 |
| DE | 2745853 | 2/1979 |
| DE | 4424685 | 1/1996 |
| DE | 1089356 | 1/2007 |

(Continued)

OTHER PUBLICATIONS

Machine translation Befurt et al. (EP-2905268), translation generated Feb. 2023, 9 pages. (Year: 2023).*
Miguel Martín-Martínez, J. "Chapter 13—Rubber base adhesives." Adhesion Science and Engineering (2002): 573-675. (Year: 2002).*
Cancellation Request for DE 202017107111 Dated Dec. 21, 2018.
International Search Report for PCT/EP2017/054386.
International Preliminary Report on Patentability for PCT/EP2020/060993.
International Search Report for PCT/EP2020/053385.
International Search Report for PCT/EP2017/054386 Mailed May 15, 2017 (English Translation).

(Continued)

*Primary Examiner* — Robert S Loewe
(74) *Attorney, Agent, or Firm* — Honigman LLP; Andrew N. Weber; Jonathan P. O'Brien

(57) ABSTRACT

Presented and described is a dispersion paint containing, in each case based on the total weight of the dispersion paint, a) 1% to 15% by weight of pigment, b) 30% to 60% by weight of filler, c) 1% to 25% by weight of polymer, d) 0.1% to 3.5% by weight of alkali metal alkyl siliconate, e) 25% to 70% by weight of water, wherein the pH of the dispersion paint is from 10 to 12. Also described is a process for producing the dispersion paint. The dispersion paint is suitable for use in interior and/or exterior applications.

18 Claims, No Drawings

(56) References Cited

FOREIGN PATENT DOCUMENTS

| | | |
|---|---|---|
| DE | 102009026039 | 12/2010 |
| DE | 102014013455 | 3/2016 |
| DE | 202014011090 | 11/2017 |
| EP | 0946274 | 10/1999 |
| EP | 1297079 | 2/2003 |
| EP | 1541225 | 6/2005 |
| EP | 1259572 | 7/2005 |
| EP | 1990102 | 11/2008 |
| EP | 2243808 | 10/2010 |
| EP | 2905268 | 8/2015 |
| EP | 2589579 A1 | 9/2015 |
| EP | 2998367 A1 | 3/2016 |
| ES | 2351590 | 8/2011 |
| GB | 2121424 | 2/1984 |
| GB | 2292695 | 3/1996 |
| JP | 47-013184 | 7/1972 |
| JP | H04107824 | 4/1992 |
| JP | 07-278463 | 10/1995 |
| JP | 2005-139320 | 6/2002 |
| JP | 4562388 | 10/2010 |
| JP | 2011-079908 | 4/2011 |
| JP | 2005-336357 | 12/2015 |
| KR | 1020150023314 A | 3/2015 |
| KR | 102311708 B1 | 10/2021 |
| RU | 2142975 | 12/1999 |
| WO | 200068324 | 11/2000 |
| WO | 2001/048098 | 7/2001 |
| WO | 2004034775 | 4/2004 |
| WO | 2005073257 | 8/2005 |
| WO | 2007080612 | 7/2007 |
| WO | 2017144694 | 8/2017 |
| WO | 2020/165118 | 8/2020 |
| WO | 2020212622 | 10/2020 |

OTHER PUBLICATIONS

Written Opinion of the International Searching Authority for PCT/EP2017/054386 Mailed May 15, 2017 (English Translation).
Google Patents translation of DE10248561 A1 (Year: 2023).
KR 10-2015-0023314 Notice of Allowance mailed Jul. 25, 2023.
Notice of Opposition in European Patent No. 3420038B1 mailed Feb. 2, 2024, 23 pages.

\* cited by examiner

DISPERSION PAINT

This application is a continuation of U.S. patent application Ser. No. 16/079,201, filed on Aug. 23, 2018, which is a U.S. National Stage Application filed under 35 U.S.C. § 371 of PCT Application No. PCT/EP2017/054386, filed on Feb. 24, 2017, which claims the benefit of priority to German Patent Application No. 102016002221.3, filed Feb. 26, 2016. The entire contents of these aforementioned applications are incorporated herein by reference in their entireties.

The present invention relates to a dispersion paint, to a process for producing the dispersion paint, to the use of the dispersion paint and to the use of alkali metal alkyl siliconates for stabilizing dispersion paints.

Various coating materials are known for the coating of substrates. These include not only silicate paints but also inter alia dispersion silicate paints and polymer dispersion paints.

Silicate paints are two-component paints containing no organic constituents. The two primary components of silicate paints are water glass and a water glass-resistant pigment. Silicate paints are typically blended immediately before application by combining the two primary components. Silicate paints therefore require several production steps and the working thereof is generally difficult and requires a great deal of experience.

Dispersion silicate paints according to DIN 18363 contain not only the water glass and the water glass-resistant pigment but also up to 5% by weight of organic constituents based on the total amount of dispersion silicate paint. Organic constituents used are especially synthetic resin dispersions. Further substances such as hydrophobizing agents may also be present in addition. The use of synthetic resin dispersions makes it possible to provide dispersion silicate paints as one-component systems.

Both silicate paints and dispersion silicate paints typically have a very strongly alkaline pH of up to 13 which necessitates relatively onerous precautions in terms of occupational health and safety.

Polymer dispersion paints, also known as dispersion paints, typically contain relatively large amounts of organic-chemical constituents, in particular of synthetic resins such as polymers, in particular in the form of synthetic resin dispersions. In order to ensure sufficient storage stability, dispersion paints typically require preservatives such as isothiazoline for example. However these can bring about skin irritation and other irritation in allergy sufferers in particular.

EP 1 297 079 B1 describes a dispersion paint containing polymer dispersion, pigment and/or filler, water glass and water. This dispersion paint has the feature that it requires no preservatives. However, due to the presence of water glass an inorganic binder is additionally present, as a result of which the properties of the dispersion paint, in particular its workability, may be impaired.

DE 1 031 910 describes an alkyd resin emulsion paint containing titanium dioxide, fillers, an alkyd resin and water. Immediately before use this paint is admixed with sodium methyl siliconate, as a result of which the modified paint exhibits better clean-up properties than alkyd resin emulsion paints without sodium methyl siliconate. DE 1 031 910 gives no indication about the pH of the alkyd resin emulsion paint, its storage stability or about the presence of preservatives. In addition, an alkyd resin emulsion paint containing sodium methyl siliconate is not intended for storage according to DE 1 031 910.

Proceeding from the prior art elucidated hereinabove it is an object of the invention to provide a dispersion paint which is substantially free from preservatives, has a good storage stability and/or is readily workable.

All or some of these objects are achieved according to the invention by the dispersion paint of claim 1, the process according to claim 11, the use according to claim 13 and the use according to claim 14.

Advantageous embodiments of the invention are specified in the dependent claims and are elucidated in detail hereinbelow.

The dispersion paint according to the invention has a pH of 10 to 12 and contains, in each case based on the total weight of the dispersion paint, the following constituents:
a. 1% to 15% by weight of pigment,
b. 30% to 60% by weight of filler,
C. 1% to 25% by weight of polymer,
d. 0.1% to 3.5% by weight of alkali metal alkyl siliconate,
e. 25% to 70% by weight of water.

It has now been found that, surprisingly, combining 1% to 15% by weight of pigment with 30% to 60% by weight of filler, 1% to 25% by weight of polymer, 0.1% to 3.5% by weight of alkali metal alkyl siliconate and 25% to 70% by weight of water in a dispersion paint having a pH of 10 to 12 affords a dispersion paint in which the components exhibit exceptional compatibility with one another. As a result, surfaces coated with the dispersion paint according to the invention have a more homogeneous appearance. This is apparent in particular in that the surfaces coated with the dispersion paint according to the invention are formed very uniformly through good levelling. As a result the dispersion paint according to the invention has exceptional workability. It has further been found that the dispersion paint according to the invention shows no discolorations after a storage time of several weeks even without preservatives. It has finally been found that the pH of the dispersion paint according to the invention remained substantially constant over a storage time of several weeks.

Without being bound to a particular theory the alkali metal alkyl siliconate appears to stabilize the dispersion paint, in particular the pH of the dispersion paint, and also to ensure good compatibility of the components. Herein, the alkali metal alkyl siliconate appears to act as a pH buffer. The presence of exclusively organic binders appears to promote a good compatibility between the components at the pH of the dispersion paint. This activity was not foreseeable in light of the required additions mentioned in DE 1 031 910 for alkali metal alkyl siliconate solutions with concentrations of up to 40% of the additions for increasing the storage stability of the alkali metal alkyl siliconate solutions.

Dispersion paints contemplated in the context of the invention are in particular interior dispersion paints, exterior dispersion paints, silicone resin paints and dispersion-based renders, including interior and exterior renders.

Alkali metal alkyl siliconates according to the invention are in particular compounds having the formula $MOSi(R)(OH)_2$, wherein M is an alkali metal and R is an alkyl substituent. Alkali metal alkyl siliconates may be obtained for example by reaction of alkyl silane triol with an alkali metal hydroxide. The production of alkali metal alkyl siliconate solutions, in particular aqueous solutions, is described for example in DE 1 031 910.

In the compounds $MOSi(R)(OH)_2$ suitable for the alkali metal alkyl siliconate according to the invention, the alkali metal M may in particular be selected from the group consisting of lithium, sodium, potassium and mixtures thereof. The alkyl substituent R is preferably selected from the group consisting of methyl, ethyl, n-propyl, iso-propyl, n-butyl, iso-butyl, tert-butyl, n-pentyl, iso-pentyl, tert-pentyl, neopentyl, phenyl, aryl, and cyclohexyl. It is preferable when the alkyl substituent is methyl. It is more preferable when the alkali metal alkyl siliconate of the dispersion paint according to the invention is selected from the group consisting of lithium methyl siliconate, sodium methyl siliconate and potassium methyl siliconate. It is most preferable when the alkali metal alkyl siliconate is potassium methyl siliconate. These alkali metal alkyl siliconates, in particular potassium methyl siliconate, result in homogeneous surfaces and are readily manageable.

In the dispersion paint according to the invention the alkali metal alkyl siliconate is contained in an amount of 0.1% to 3.5% by weight based on the total weight of the dispersion paint. It is preferable when the dispersion paint according to the invention contains 0.1% to 2% by weight, in particular 0.3% to 2% by weight or 0.5% to 1.5% by weight, of alkali metal alkyl siliconate in each case based on the total weight of the dispersion paint. Dispersion paints having these contents show a good workability and a good storage stability.

According to the invention the dispersion paint contains 1% to 15% by weight of pigment. Various substances are suitable as the pigment. It is preferable when the pigment is selected from the group consisting of titanium dioxide, iron oxide yellow, arylide (monoazo), bismuth vanadate, perinone, rutile-tin-zinc, quinacridone, diketopyrrolopyrrole, iron oxide red, phthalocyanine blue, dioxazine, cobalt blue, ultramarine blue, phthalocyanine green, chromium oxide green, cobalt green, color carbon black, iron oxide black, pyrazoloquinazolone, naphthol AS monoazopigment and mixtures thereof. In a preferred embodiment of the invention the dispersion paint contains 3% to 13% by weight of pigment, more preferably 5% to 12% by weight of pigment.

In one embodiment it is preferable to employ inorganic pigments. Examples of inorganic pigments are oxides such as titanium dioxide, iron oxides, for example P.Y. 42, P.R. 101, P.Bk. 11, chromium oxide green, for example P.G. 17, mixed phase pigments, for example cobalt oxide blue P.B. 28 and green P.G. 50, bismuth vanadate P.Y. 184, rutile-tin-zinc P.O. 216, silicates, for example ultramarine blue P.B. 29 and carbon, for example carbon black P.Bk. 7.

In a further embodiment it is preferable to employ organic pigments. Examples of organic pigments are azo pigments, for example arylide yellow (monoazo) P.Y. 74, polycyclic pigments, for example quinacridone P.R. 122, perinone P.O. 43, pyrazoloquinazolone P.O. 67, diketopyrrolopyrrole (DPP) P.R. 254, dioxazine P.V. 23 and metal complex pigments, for example copper phthalocyanine blue P.B. 15:3 and green P.G. 7.

The designations used for the examples of inorganic and organic pigments correspond to the generic names of the color index of the British Society of Dyers and Colourists.

In a further embodiment mixtures of inorganic pigments and organic pigments are employed.

Use of the recited pigments makes it possible to produce colored dispersion paints covering substantially the entire color spectrum.

In addition to the components pigment, polymer, alkali metal alkyl siliconate and water, the dispersion paint according to the invention contains filler. The filler is preferably selected from the group consisting of dolomite, barium sulfate, feldspar, quartz, calcium carbonate, mica, kaolin, calcinated kaolin, talc, diatomaceous earth and mixtures thereof. The filler is more preferably a mixture of at least calcium carbonate and kaolin. Such fillers afford dispersion paints having a good workability.

Calcium carbonate may be employed in different forms, for example in the form of chalk or calcite.

Practical tests have shown that dispersion paints affording particularly homogeneous coatings are obtained when the filler particles are small. It is advantageous when the filler particles of the dispersion paint according to the invention have a size of less than 100 µm, in particular less than 80 µm, preferably of 0.1 to 50 µm, more preferably of 1 to 30 µm. Processes for determining the particle size are known to those skilled in the art. For example the particle size may be determined by means of a grindometer according to DIN EN ISO 1524, in particular according to DIN EN ISO 1524: 2013-06. The particle size of the fillers relates in particular to the maximum agglomerate size in the dispersion paint. Furthermore, the particle size, in particular the particle size distribution, may also be determined by means of transmission electron microscopy.

According to the invention the pH of the dispersion paint is from 10 to 12, preferably from 10.5 to 11.5. It was found that dispersion paints having the recited pH values exhibit little discoloration, if any, even upon storage over several weeks, even when substantially free from preservatives. It is yet more preferable when the pH of the dispersion paint is from 10.5 to 11.4. Dispersion paints according to the invention having such pH values had the additional advantage of being usable even without particular occupational health and safety precautions.

The pH may be adjusted for example by addition of alkaline substances, also known as alkalizers. Examples of alkaline substances are alkali metal hydroxides such as lithium, sodium and/or potassium hydroxide, alkaline earth metal hydroxides such as magnesium, calcium and/or barium hydroxide, ammonium hydroxide, xonotlite ($6CaO·6SiO_2·H_2O$) and/or ittringite ($Ca_6[Al(OH)_6]_2(SO_4\times 26H_2O)$). The xonotlite preferably has a monoclinic crystal system (monoclinic xonotlite). It has been found that xonotlite and/or ittringite are particularly advantageously employable in combination with the alkali metal alkyl siliconate present in the dispersion paint according to the invention. In particular, dispersion paints containing xonotlite and/or ittringite as alkalizers in addition to alkali metal alkyl siliconate exhibit an increased pH stability. In a preferred embodiment of the invention the dispersion paint according to the invention contains in addition to alkali metal alkyl siliconate alkalizers in an amount from 0.005% to 3% by weight, in particular from 0.01% to 1% by weight, based on the total composition of the dispersion paint. In particular the dispersion paint according to the invention may contain 0.005% to 3% by weight, in particular 0.01% to 1% by weight, of xonotlite and/or ittringite based on the total composition of the dispersion paint.

In one embodiment of the invention the pH of the dispersion paint according to the invention remains substantially constant over a period of at least 4 weeks, preferably at least 8 weeks, more preferably at least 12 weeks, yet more preferably at least 16 weeks, yet more preferably at least 20 weeks.

According to the invention the dispersion paint contains 1% to 25% by weight of polymer based on the total weight of the dispersion paint. It is preferable when the dispersion paint contains 2% to 23% by weight, more preferably 4% to 20% by weight, of polymer, in each case based on the total weight of the dispersion paint. The reported contents of polymer in the dispersion paint relate in each case to the polymer as solids content. However, it is preferable when the polymer is added in the form of a dispersion, in particular an aqueous dispersion, during the production of a dispersion paint. It is advantageous when these polymer dispersions, in particular the aqueous polymer dispersions, contain 40% to 70% by weight, preferably 45% to 60% by weight, more preferably 45% to 55% by weight, of polymer. If the polymer is added as an aqueous polymer dispersion the water of the polymer dispersion is treated as part of the total water content of the dispersion paint. Dispersion paints containing polymer in these amounts have shown good working properties.

Various polymers are suitable as the polymer of the dispersion paint. It is preferable when the polymer of the dispersion paint according to the invention contains at least one polymer and/or copolymer based on at least one monomer selected from the group consisting of acrylic acid, acrylic acid derivatives, acrylic acid esters, methacrylic acid, methacrylic acid derivatives, methacrylic acid esters, styrene, styrene derivatives, N-vinylpyrrolidone, acrylonitrile, vinyl acetate, vinyl propionate, ethylenically unsaturated carboxylic acids, ethylenically unsaturated carboxylic acid esters, ethylenically unsaturated carboxylic acid anhydrides, ethylenically unsaturated carboxylic acid amides and carboxylic acid vinyl esters. It is particularly preferable when the polymer of the dispersion paint contains at least one polymer based on acrylic acid derivatives and/or styrene. When using acrylic acid esters and/or methacrylic acid esters it is preferable for the alcohol substituent to contain 1 to 12 carbon atoms. The alcohol substituent may further be branched or unbranched. In a preferred embodiment the polymer of the dispersion paint consists of at least one of the abovementioned polymers and/or copolymers.

The dispersion paint according to the invention may additionally contain as further additives dispersants, wetting agents, thickeners, stabilizers, defoamers and/or hydrophobizing agents.

Examples of thickeners are alcohol alkoxylates, ethylene oxide-propylene oxide copolymers, maleic anhydride-diisobutylene copolymers, polyacrylic and polymethacrylic acid and salts thereof, methylcelluloses, carboxy methylcelluloses, hydroxyl methylcelluloses, polyurethanes, alkali metal phosphates and salts of modified phosphoric acids, and mixtures thereof.

Examples of defoamers are polyglycols, triglycerides, polysiloxane-polyether copolymers and silicone oils.

Examples of hydrophobizing agents are in particular oligomeric and polymeric siloxanes and silicone resins.

In a preferred embodiment the dispersion paint according to the invention is substantially free from preservatives, in particular from isothiazolines.

The invention further provides a process for producing the dispersion paint according to the invention, comprising the steps of
a. providing a composition containing, in each case based on the total weight of the dispersion paint,
  i. 1% to 15% by weight of pigment,
  ii. 30% to 60% by weight of filler,
  iii. 1% to 25% by weight of polymer,
  iv. 0.1% to 3.5% by weight of alkali metal alkyl siliconate,
  V. 25% to 70% by weight of water,
b. dispersing the components recited in a.,
C. adjusting the pH to a value of 10 to 12.

The recited steps may be performed in any desired sequence, preferably the recited steps are performed in the recited sequence.

What is stated with regard to the alkali metal alkyl siliconate in connection with the dispersion paint according to the invention also applies equally to the alkali metal alkyl siliconate of the process according to the invention.

What is stated with regard to the pigment in connection with the dispersion paint according to the invention also applies equally to the pigment of the process according to the invention.

What is stated with regard to the filler in connection with the dispersion paint according to the invention also applies equally to the filler of the process according to the invention.

What is stated with regard to the pH and to the alkaline substance in connection with the dispersion paint according to the invention also applies equally to the pH and to the alkaline substance of the process according to the invention.

What is stated with regard to the polymer in connection with the dispersion paint according to the invention also applies equally to the polymer of the process according to the invention.

The dispersion paint according to the invention is suitable for various uses. It is in particular suitable for the use in interior and/or exterior applications.

The invention likewise relates to the use of alkali metal alkyl siliconates, in particular of potassium methyl siliconate, for stabilizing dispersion paints.

The invention is hereinbelow more particularly elucidated using examples which are, however, only explanatory and nonlimiting.

EXAMPLES

Dispersion paints having the following formulations reported in table 1 were produced by mixing the constituents stated in table 1, amounts added being in % by weight in each case.

TABLE 1

| Constituent | Formulation A | Formulation B |
|---|---|---|
| Titanium dioxide | 6 | 11 |
| Styrene acrylate (50% by weight in water) | 19 | 11 |
| Potassium methyl siliconate | 1 | 1.5 |
| Calcium carbonate | 21.7 | 32.5 |
| Kaolin | 20.8 | 8 |
| Alkaline compound | 0.05 | 0.5 |
| Defoamer | 0.2 | 0.28 |
| Thickener | 0.5 | 0.75 |
| Wetting agent | 0.46 | 0.3 |
| Water | 30.29 | 34.17 |
| pH | 11.3 | 11.4 |

The formulations A and B showed a storage stability of more than 6 months without discolorations and were readily workable. In particular the formulations showed a good workability and after application afforded surfaces having a homogeneous overall impression. After 6 months, formulation A had a pH of 11.3 and formulation B had a pH of 11.4.

The invention claimed is:
1. A dispersion paint comprising:
(a) 1% to 15% by weight of pigment;
(b) 30% to 60% by weight of filler, wherein the filler includes particles having a size ranging from 0.1 μm to 50 μm;
(c) 1% to 25% by weight of polymer;
(d) 0.1% to 3.5% by weight of alkali metal alkyl siliconate; and
(e) 25% to 70% by weight of water;

wherein the pH of the dispersion paint is from 10 to 12 and the % by weight is based on the total weight of the dispersion paint and the dispersion paint contains exclusively organic binders.

2. The dispersion paint of claim 1, wherein the dispersion paint contains 0.1% to 2% by weight alkali metal alkyl siliconate.

3. The dispersion paint of claim 1, wherein the alkali metal alkyl siliconate is potassium methyl siliconate.

4. The dispersion paint of claim 1, wherein the pigment is selected from the group consisting of titanium dioxide, iron oxide yellow, an arylide (monoazo) pigment, bismuth vanadate, perinone, rutile-tin-zinc, quinacridone, diketopyrrolopyrrole, iron oxide red, phthalocyanine blue, dioxazine, cobalt blue, ultramarine blue, phthalocyanine green, chromium oxide green, cobalt green, color carbon black, iron oxide black, pyrazoloquinazolone, naphthol AS monoazo pigment, and mixtures thereof.

5. The dispersion paint of claim 1, wherein the filler is selected from the group consisting of dolomite, barium sulfate, feldspar, quartz, calcium carbonate, mica, kaolin, calcinated kaolin, talc, diatomaceous earth and mixtures thereof.

6. The dispersion paint of claim 5, wherein the filler is a mixture comprising at least calcium carbonate and kaolin.

7. The dispersion paint of claim 1, wherein the pH of the dispersion paint is from 10.5 to 11.5.

8. The dispersion paint of claim 1, wherein the pH of the dispersion paint remains substantially constant over a period of at least 4 weeks.

9. The dispersion paint of claim 1, wherein the dispersion paint comprises 2% to 23% by weight of polymer based on the total weight of the dispersion paint.

10. The dispersion paint of claim 9, wherein the polymer contains at least one polymer and/or copolymer based on at least one monomer selected from the group consisting of acrylic acid, acrylic acid derivatives, acrylic acid esters, methacrylic acid, methacrylic acid derivatives, methacrylic acid esters, styrene, styrene derivatives, N-vinylpyrrolidone, acrylonitrile, vinyl acetate, vinyl propionate, ethylenically unsaturated carboxylic acids, ethylenically unsaturated carboxylic acid esters, ethylenically unsaturated carboxylic acid anhydrides, ethylenically unsaturated carboxylic acid amides and carboxylic acid vinyl esters.

11. The dispersion paint of claim 1, wherein the dispersion paint further comprises at least one additive selected from the group consisting of dispersants, wetting agents, thickeners, stabilizers, defoamers and/or hydrophobizing agents.

12. A process for coating interior and/or exterior substrates comprising applying the dispersion paint of claim 1 to a substrate.

13. The dispersion paint of claim 1, wherein the dispersion paint contains 0.5% to 1.5% by weight alkali metal alkyl siliconate.

14. The dispersion paint of claim 1, wherein the pH of the dispersion paint is from 10.5 to 11.4.

15. The dispersion paint of claim 1, wherein the pH of the dispersion paint remains substantially constant over a period of at least 20 weeks.

16. The dispersion paint of claim 1, wherein the dispersion paint comprises 4% to 20% by weight of polymer based on the total weight of the dispersion paint.

17. A process for producing a dispersion paint comprising:
(a) providing a composition comprising:
 (i) 1% to 15% by weight of pigment;
 (ii) 30% to 60% by weight of filler, wherein the filler includes particles having a size ranging from 0.1 μm to 50 μm;
 (iii) 1% to 25% by weight of polymer;
 (iv) 0.1% to 3.5% by weight of alkali metal alkyl siliconate; and
 (v) 25% to 70% by weight of water;
(b) dispersing the components recited in step a); and
(c) adjusting the pH to a value of 10 to 12;
wherein the % by weight is based on the total weight of the dispersion paint and the dispersion paint contains exclusively organic binders.

18. The process of claim 17, wherein:
the composition comprises 0.1% to 2% by weight of the composition of alkali metal alkyl siliconate;
the pigment is selected from the group consisting of titanium dioxide, iron oxide yellow, an arylide (monoazo) pigment, bismuth vanadate, perinone, rutile-tin-zinc, quinacridone, diketopyrrolopyrrole, iron oxide red, phthalocyanine blue, dioxazine, cobalt blue, ultramarine blue, phthalocyanine green, chromium oxide green, cobalt green, color carbon black, iron oxide black, pyrazoloquinazolone and mixtures thereof;
the pH of the dispersion paint is from 10.5 to 11.5, wherein the pH remains substantially constant over a period of at least 4 weeks;
the composition comprises 2% to 23% by weight of the composition of polymer wherein the polymer comprises at least one monomer selected from the group consisting of acrylic acid, acrylic acid derivatives, acrylic acid esters, methacrylic acid, methacrylic acid derivatives, methacrylic acid esters, styrene, styrene derivatives, N-vinylpyrrolidone, acrylonitrile, vinyl acetate, vinyl propionate, ethylenically unsaturated carboxylic acids, ethylenically unsaturated carboxylic acid esters, ethylenically unsaturated carboxylic acid anhydrides, ethylenically unsaturated carboxylic acid amides, and carboxylic acid vinyl esters; and/or
the composition further comprises at least one additive selected from the group consisting of dispersants, wetting agents, thickeners, stabilizers, defoamers and/or hydrophobizing agents.

* * * * *